May 4, 1948. J. T. KRAPP 2,441,075
COUPLING
Filed Aug. 14, 1945 3 Sheets-Sheet 1
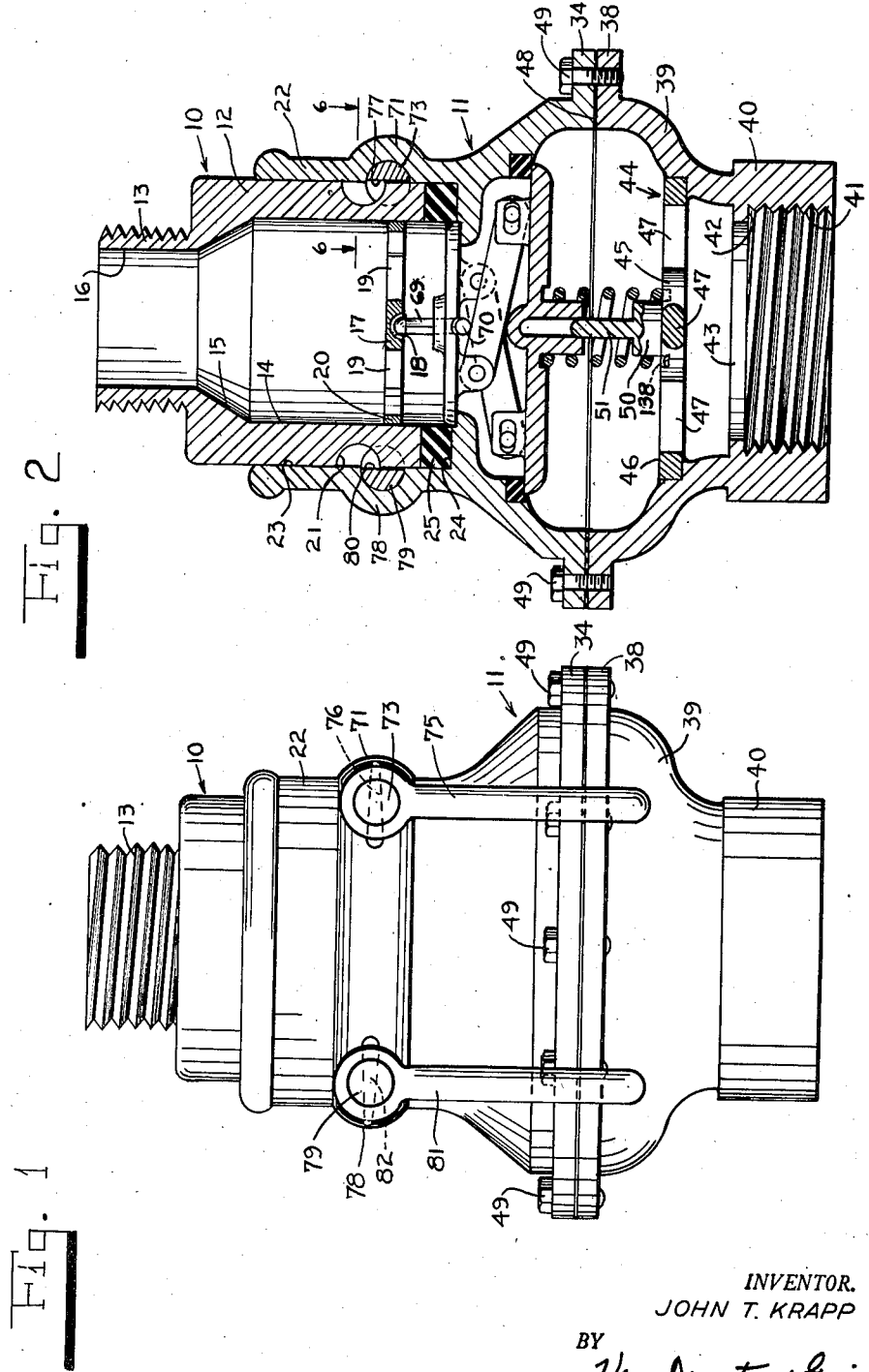
INVENTOR.
JOHN T. KRAPP
BY
Van Deventer + Grier
ATTORNEYS May 4, 1948. J. T. KRAPP 2,441,075
COUPLING
Filed Aug. 14, 1945 3 Sheets-Sheet 2
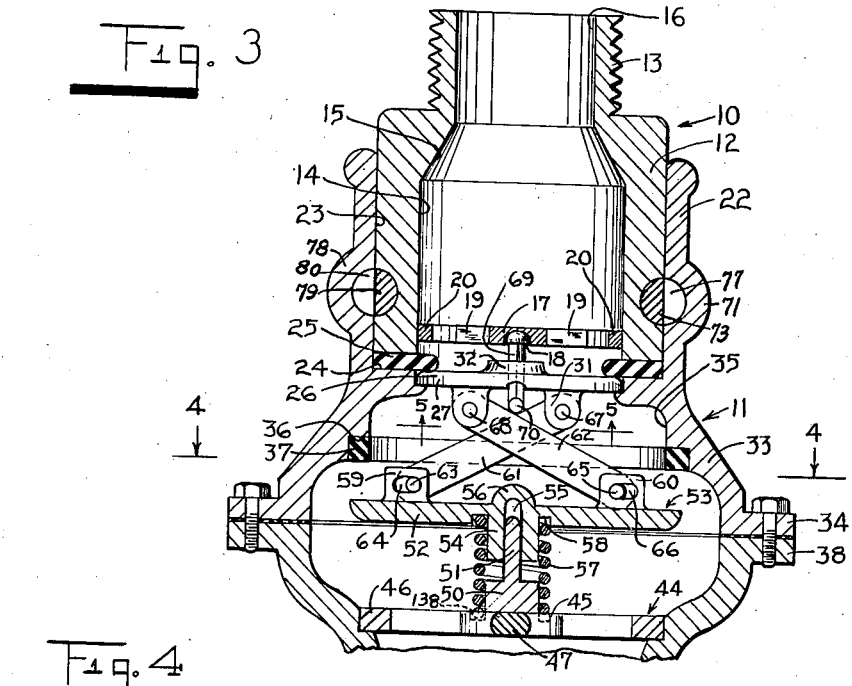
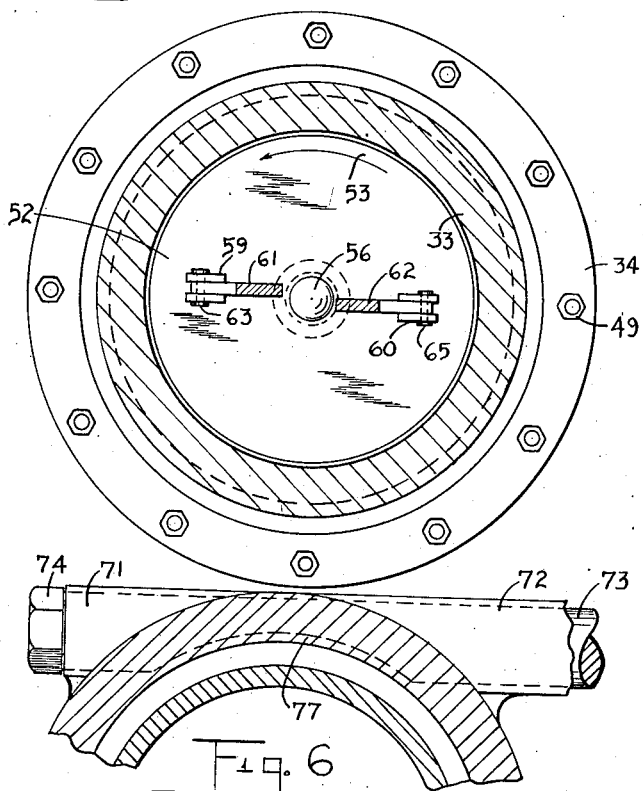
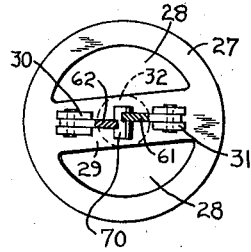
INVENTOR.
JOHN T. KRAPP
BY
Van Deventer + Grier
ATTORNEYS

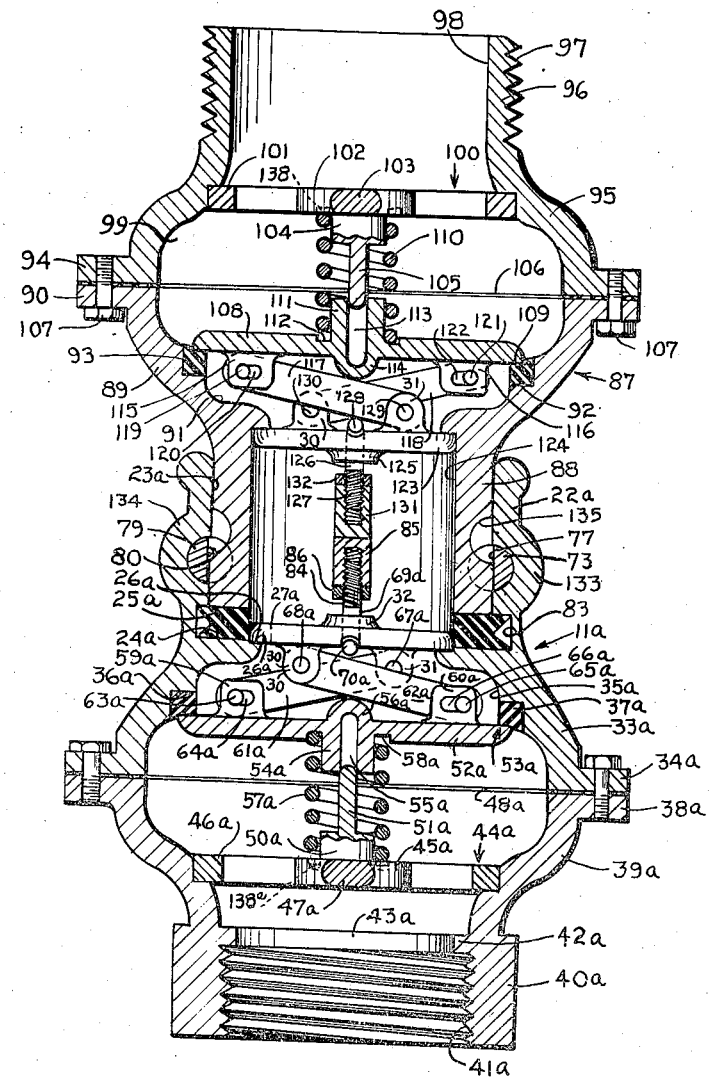

Patented May 4, 1948

2,441,075

UNITED STATES PATENT OFFICE 2,441,075

COUPLING

John T. Krapp, Port Washington, N. Y.

Application August 14, 1945, Serial No. 610,779

10 Claims. (Cl. 284—19)

This invention relates to improvements in couplings and has for an object the provision of of a quickly separable coupling at least one member of which includes a valve which closes as the members of the coupling are separated and opens as the members of the coupling are forced together in normal co-operative relationship.

Another object of the invention is the provision of a coupling including two quickly separable members adapted to be placed together and cammed into co-operative relationship, one of said members being adapted to be connected to a fluid medium and including a valve which is closed when the members are separated, and which opens and allows the fluid medium to flow when the two members are cammed together to form a fluid tight seal between each other.

Yet another object of the invention is the provision in at least one member of a separable coupling, a valve member adapted to open and provide a substantially unrestricted orifice for fluids under the urge of a substantially smaller motion employed while said coupling members are being forced together in fluid tight relationship.

A further object of the invention is the provision of a quickly separable coupling comprised of not less than two co-operative members each of which includes valve means which are closed when the coupling members are separated and which are opened when the coupling members are placed together and forced into sealing relation with each other.

Other objects and advantages of the invention will be apparent to those skilled in the art, and upon the study of the following specification and the accompanying drawings.

Referring to the drawings which are given by way of example to illustrate the invention:

Figure 1 is an elevation of one embodiment of my new and improved coupling;

Figure 2 is a sectional elevation of the coupling shown in Figure 1, the valve means therein being closed;

Figure 3 is a sectional elevation similar to Figure 2, except that the two coupling members have been clamped together in fluid tight relation and the forcing of the two members together to form a fluid tight seal has been multiplied through the linkages shown to open the valve means so that fluid mediums can flow substantially unobstructed through the coupling;

Figure 4 is a plan view partly in section taken along the lines 4—4 of Figure 3;

Figure 5 is a view taken along the lines 5—5 of Figure 3;

Figure 6 is a fragmentary view showing the relation of one of the camming members carried on one of the coupling members and showing its relation to the annular groove formed in the other coupling member; this view is taken along the lines 6—6 of Figure 2, and Figure 7 is a sectional elevation of a coupling comprised of two members each of which includes a valve adapted to close when the members are separated, both said valves being adapted to open when said members are cammed together.

Referring first to Figures 1, 2 and 3, the coupling is comprised of two quickly separable members one of which is generally designated by the numeral 10, and the other of which is generally designated by the numeral 11. The portion 10, which might be termed the male portion, includes a tubular body 12, and formed integral therewith is a threaded boss 13. The tubular portion 12 has an interior bore 14 which extends from the lower end to meet a tapered hole 15. The threaded boss 13 has an interior bore 16 which extends from the top end (as viewed in Fig. 2) to the tapered hole 15. Adjacent the lower end and mounted in the bore 14 is a spider having a hub 17 with a rounded cavity 18 formed therein and facing downwardly. Extending radially from the hub 17 are a plurality of spokes two of which are shown at 19—19 and these spokes join a ring portion 20 which is secured to or cast integral with the interior wall of the bore 14. On the outside of the tubular portion 12, near the lower end thereof, is formed an annular groove 21. It will be understood that although the member 10 is shown as carrying an externally threaded boss 13, it may instead carry flanges or any other form of connection suitable for connecting it to a point of use.

The coupling member 11 has a tubular portion 22, the interior bore 23 of which is adapted to accommodate the tubular portion 12. The bore 23 terminates on a shoulder 24 formed in the body of the portion 22. Mounted on the shoulder 24 is an annular washer 25 which may be formed of rubber or like resilient material. The shoulder 24 is stepped or counterbored at 26 to form a shoulder for the member 27. The member 27 can be seen from below in Fig. 5, and it consists of a ring with cut-out sectors 28 and having therebetween a web 29 carrying slotted bosses 30 and 31 in spaced relation to each other. The web 29 carries on its opposite face a boss 32. The member 27 is permanently secured on the shoulder 26 and supports a valve which will presently be described. Contiguous with the portion 22 is a portion 33 which tapers outwardly and terminates in an annular flange 34. The interior of the portion 33 has a bore 35 which is counterbored to form an annular shoulder 36 upon which is mounted a sealing ring with which the valve to be presently described, co-operates. The member 11 has a lower portion which carries a flange 38 adapted to co-operate with the flange 34. Extending downwardly from the flange 38 (referring particularly to Fig. 2), the body 39 flares inwardly and downwardly and terminates in a boss 40 which has an interior threaded bore 41 terminating against a shoulder 42. The boss 41 has an opening 43 formed therein which forms an inner boundary of the shoulder 42. Spaced apart from the opening 43 is a spider 44 which includes a hub 45 which is joined to an annular rim 46 by means of a plurality of spokes 47, the openings therebetween forming passages for the fluid. The rim 46 may be formed integral with the body 39, or it may be formed separately and permanently secured in the body 39.

Between the flanges 34 and 38 a suitable sealing ring 48 is provided and these flanges are secured together in sealing relation by means of bolts 49 which extend through holes in the flange 34 and engage threaded holes in the flange 38. Mounted on the hub 45 of the spider 44 is a stud 50 which has a shank 51.

A valve member 52 consists of a disc having an annular seating surface 53 adapted to seat on the sealing ring 37. The valve member has a downwardly extending boss 54 with a central vertical hole 55 formed therein. The upper end of the hole 55 is closed by a rounded stud 56. Surrounding the boss 50 and the boss 54 is a helical spring 57, the lower end of which seats in a depression 138 formed in the hub 45 and the upper end of which fits in an annular depression 58 formed in the valve member 52 adjacent to the boss 54. The function of the spring 57 is to urge the valve member 52 against the sealing ring 37.

Formed on the upper surface of the valve member 52, in spaced relation to each other, are bosses 59 and 60. These bosses are slotted to accommodate link members 61 and 62. The lower end of the link member 61 carries a pin 63 which is positioned in aligned elongated holes 64 formed in the two halves of the slotted boss 59. Likewise the lower end of the link member 62 carries a pin 65 which is positioned in aligned elongated holes 66 formed in the slotted boss 60. The upper end of the link 61 carries a pin 67 which fits in aligned holes formed in the slotted boss 31. Likewise the upper end of the link member 62 carries a pin 68 which fits in aligned holes formed the slotted boss 30. The boss 32, carried on the member 27, may have a square hole extending therethrough vertically, and mounted in this hole is a square rod 69 the upper end of which is adapted to be engaged by the cavity 18 formed in the hub 17. The lower end of the rod 69 may have formed integral therewith or permanently secured thereto, a rounded camming member 70 which engages the link members 61 and 62 and thereby force the valve 52 off of the sealing ring 37 when the coupling members 10 and 11 are clamped into sealing relation with each other.

Referring now to Fig. 6, the tubular portion of the member 11 has formed thereon aligned bosses 71, 72 which are machined out to form a working fit with a shaft 73. The shaft 73 is threaded at one end and carries a nut 74, and the other end, as may be seen in Fig. 1, has a lever 75 mounted thereon and keyed thereto by means of a taper pin 76. The shaft 73, as is shown in dotted lines in Fig. 6, has an arcuate cut-out portion 77 which, as may be seen in Fig. 2, is adapted to clear the portion 10 when it is inserted into the bore 23 of the tubular portion 22. On the opposite side of the tubular portion 22 are aligned bosses one of which may be seen at 78 and these bosses are parallel to the bosses 71, 72 above described. These bosses are machined out to form a working fit with a shaft 79 which is identical with the shaft 73 and which has an arcuate cut-out portion 80 like the cut-out portion 77 on the shaft 73. The shaft carries a nut on one end corresponding to the nut 74, and mounted on the other end is a handle 81 which is secured to the end of the shaft 79 by means of a taper pin 82.

Normally the handles 75 and 81 may point downwardly, as shown in Fig. 1, said positions defined by stops, not shown. When the portion 10 is inserted in the bore 23 and it is desired to clamp the two members together in fluid tight relation, the handle 75 is turned in a counter-clockwise direction as viewed in Figs. 1 and 2, and the handle 81 is turned in a clockwise direction until both handles extend vertically, said positions being defined by other stops, not shown.

The act of turning the handles in the directions described causes the cut-away surface 77 on the shaft 73 to engage the annular groove 21 on one side of the member 10 and causes the cut-away portion 80, of the shaft 79, to engage the annular groove 21 on its opposite side. As the shafts are rotated by the handles the member 10 is moved downwardly against the resiliency of the rubber washer or ring 25 and at the same time the cavity, or depression, 18 in the hub engages the rod 69 thereby causing the camming member 70 to bear against the link members 61 and 62 and unseat the valve member 52 thereby permitting fluid medium from any source to which the coupling member 11 is connected, to flow therethrough. When it is desired to separate the coupling members, the handle 75 is turned in a clockwise direction and the handle 81 is turned in a counter-clockwise direction thereby causing the shafts 73 and 79 respectively to become disengaged from the annular groove 21. When this occurs the spring 57 urges the valve member 52 upwardly and firmly urges it into seating relation with the sealing ring 37. The resiliency of the washer 25 urges the member 10 upwardly a sufficient distance to "break the hold" thereby permitting it to be easily removed from the bore 23.

Referring now to Fig. 7, a modification of the invention is shown in which each half of the coupling includes a valve which is open when the members are clamped together in sealed relation and which closes when the members move axially, for example, in the act of being separated.

As viewed in Fig. 7, the lower half of the coupling 11a is generally identical with the lower half 11 of the coupling shown in Fig. 2. In the following description, all elements of the lower half of the coupling which are identical with the lower half of the coupling shown in Fig. 2, will bear the same number followed by the letter a. The coupling member 11a has a tubular portion 22a, the interior bore 23a of which is adapted to accommodate the tubular portion of the other member. The interior bore 23a terminates on a shoulder 24a formed in the body of the portion 22a. The shoulder 24a is contiguous with the lower edge of a groove 83. Mounted on the shoulder 24a and extending into the groove 83 is an annular washer 25a which may be formed of rubber or like resilient material. The groove prevents the washer 25a from falling out of the body 11a when the coupling members are separated. The shoulder 24a is stepped or counter-bored at 26a to form a shoulder for the member 27a. The member 27a is similar to the member 27 shown in Fig. 5, and it consists of a ring with cut-out sectors 28 and having therebetween a web 29 carrying slotted bosses 30 and 31 in spaced relation to each other. The web 29 carries on its opposite face a boss 32. The member 27a is permanently secured on the shoulder 26a and supports a valve which will presently be described.

Contiguous with the portion 22a is a portion 33a which tapers outwardly and terminates in an annular flange 34a. The interior of the portion 33a has a bore 35a which is counterbored to form an annular shoulder 36a upon which is mounted a sealing ring 37a with which the valve, to be presently described, cooperates.

The member 11a has a lower portion which carries a flange 38a adapted to co-operate with the flange 34a. Extending downwardly from the flange 38a the body 39a flares inwardly and downwardly and terminates in a boss 40a which has an interior threaded bore 41a which is bounded by an inwardly extending shoulder 42a. The boss 41a has an opening 43a formed therein and constitutes the inner boundary of the shoulder 42a. Spaced apart from the opening 43a is a spider 44a which includes a hub 45a which is joined to an annular rim 46a by means of a plurality of spokes 47a, the openings therebetween forming passages for the fluid medium. The rim 46a may be formed integral with the body 39a, or it may be formed separately and permanently secured in the body 39a. Between the flanges 34a and 38a is a suitable sealing ring 48a and the flanges are secured together with the sealing ring therebetween by means of bolts 49a which extend through holes in the flange 34a and engage threaded holes in the flange 38a. Mounted on the hub 45a is a stud 50a which has a shank 51a. A valve member 52a consists of a disc having an annular seating surface 53a adapted to seat on the sealing ring 37a. The valve member has a downwardly extending boss 54a with a central hole 55a formed therein. The upper end of the hole 55a terminates within a rounded boss 56a.

Surrounding the bosses 50a and 54a, is a helical spring 57a the lower end of which bears in a groove 138a formed on the hub 45a, and the upper end of which extends into an annular depression 58a formed in the valve member 52a adjacent to the boss 54a. The function of the spring 57a is to urge the valve member 52a against the ring 37a.

Formed on the upper surface of the valve member 52a, in spaced relation to each other, are bosses 59a and 60a. These bosses are slotted to accommodate link members 61a and 62a respectively. The lower end of the link member 61a carries a pin 63a which is positioned in aligned elongated holes 64a formed in the two halves of the slotted boss 59a. Likewise the lower end of the link member 62a carries a pin 65a which is positioned in aligned elongated holes 66a formed in the slotted boss 60a. The upper end of the link 61a carries a pin 67a which fits in aligned holes formed in the slotted boss 31. Likewise the upper end of the link member 62a carries a pin 68a which fits in aligned holes formed in the slotted boss 30. The boss 32 carried on the member 37a may have a square hole extending therethrough vertically with a square rod 69a mounted therein. The lower end of the rod 69a may have formed integral therewith, or permanently secured thereto, a rounded camming member 70a which engages the link members 61a and 62a and thereby force the valve 52a away from the sealing ring 37a when the coupling members are clamped together, as will presently be described.

The upper end of the square rod 69a has a portion 84 which is round and provided with threads. An engaging member 85 has an interiorly threaded hole engaging a threaded portion 84 of the push rod 69a so that the engaging member may be adjusted up and down on the said threaded portion to obtain a desired adjustment. A lock nut 86 on the portion 84 is provided for locking the engaging member 85 in a set position. The upper half of the coupling is generally designated by the numeral 87 and includes a tubular body 88 which fits into the bore 23a of the lower half of the coupling.

Contiguous with the portion 88 is a portion 89 which tapers outwardly and terminates in an annular flange 90. The interior of the portion 89 has a bore 91 which is counterbored to form an annular shoulder 92 upon which is mounted a sealing ring 93. The sealing ring co-operates with a valve which will presently be described. The member 87 has an upper portion which carries a flange 94. Extending upwardly from the flange 94 the body 95 flares inwardly and upwardly and terminates in a boss 96. The exterior surface of the boss 96 may be provided with threads 97 to be engaged by a suitable fitting. The boss 96 has an interior bore 98 which forms a part of a passage 99 extending through the member 87. The portion 95 carries a spider 100. The spider 100 has a rim 101 which may be formed integral with the body 95 or it may be formed outside of the body and permanently mounted therein. The spider also has a hub 102 carrying a plurality of spokes 103 which join the rim 101, the openings therebetween forming passages between the opening provided by the bore 98 and the interior 99.

Secured to the hub 102 is a stud 104 having a shank 105 of reduced diameter.

Between the flanges 90 and 94 is positioned a sealing ring 106 and the flanges are secured together with the sealing ring therebetween by means of bolts 107 which extend through holes in the flange 90 and engage threaded holes in the flange 94. A valve member 108, similar to the valve member 52a, has a seating face 109 adapted to seat on the sealing ring 93 under the urge of a spring 110 which embraces the stud 104 mounted on the hub 102 and the upper end seats in groove 138. The spring 110 also embraces a boss 111 formed integral with the valve member 108 and has its end seating in a groove 112 formed in the valve member adjacent to the boss 111. The boss 111 has a clearance hole 113 for the shank 105. The hole 113 bottoms in a rounded boss 114 formed on the lower face of the valve in the center thereof. The valve 108 carries on its lower surface spaced bosses 115, 116 which are slotted to accommodate the upper ends of link members 117 and 118 respectively. The upper end of the link member 117 carries a pin 119 which is mounted in aligned oblong holes 120 formed in the boss 115. Likewise, the upper end of the link member 118 carries a pin 121 which is mounted in aligned elongated holes 122 in the boss 116.

A spider 123 is secured in the interior bore 124 formed in the portion 88. This spider may be identical with the spider shown in Fig. 5 and carries a boss 125 with a rectangular hole therein. Slidably mounted in the rectangular hole is a square rod 126 which has a round threaded portion 127. The upper end of the rod 126 has secured thereto, in cross-wise relation, a round camming member 128 which acts against the link members 117, 118. The lower end of the link member 117 carries a pin 129 which extends through aligned holes in a boss 31 thereof. The lower end of the link member 118 carries a pin 130 which extends through aligned holes in the boss 39. The threaded portion 127 carries an engaging member 131 which may be adjusted up and down thereon by means of the threads and which may be locked in an adjusted position by means of a lock nut 132. The manner in which the members 112 and 87 are secured together in sealed relation is exactly like that described in connection with the members 10 and 11 in Figs. 1, 2 and 3. The member 11a carries shafts 73 and 79 on opposite sides thereof, the shaft 73 extending through a boss 133 formed on the portion 22a, and the shaft 79 extends through a boss 134 carried on the opposite side of the portion 22a. The portion 88 has an annular groove 135 formed therein and this groove is preferably of hollow semi-circular cross section. The shaft 73 has a cut-away portion 77 which cams against the lower boundary of the groove 135 and as the shaft 73 is rotated in a counter-clockwise direction the member 87 is cammed downwardly in sealed relation with the sealing ring 25a. The shaft 79 has a cut-away portion 80 which cams against the lower edge of the groove on the opposite side of the member 88 when the shaft 79 is rotated in a clockwise direction. It will be understood that the shaft 73 is provided with a handle similar to the handle 75, shown in Fig. 1, and the shaft 79 is provided with a handle similar to the handle 81. As these shafts are rotated to bring the lower end of the member 88 into sealing relation with the washer 25a, the washer is squeezed and flattened. The engaging members 85 and 131 have been adjusted so that as soon as the camming surfaces 77 and 80 engage the groove 135 the engaging members touch one another. When the shafts 73 and 79 are rotated to a point where the slotted portions thereof lie in the groove 135, the valve member 52a and the valve member 108 are moved away from their seats (in contact with the rings 37a and 93 respectively), due to the action of the camming members 70a against the linkages 61a and 62a, and the camming action of the member 128 against the link members 117 and 118. Therefore, when the two members are placed together in the manner described above to sealingly connect them, the valves are opened the while so that fluid mediums in vessels, connected to the threaded portions 41a on one of the members and 97 on the other of the members, will flow therethrough. This eliminates the necessity of having separate valves in each line which would have to be opened by hand after the coupling members have been secured together in sealed relation.

When the shaft 79 is turned in a counter-clockwise direction and the shaft 73 in a clockwise direction, the reaction of the rubber ring or washer 25a forces the couplings in opposite directions and the engaging members 85 and 131 tend to move away from each other. However, the spring 57a urges the valve member 52a back on its seat and the spring 110 urges the valve member 108 back on its seat so that as the members 11a and 87 are separated, the valves have closed the passages in these members so that the fluid medium in both the source and the vessel receiving the same are cut off from and cannot leak into the atmosphere.

Although I have herein shown and described, by way of example, a quickly separable coupling member which includes a valve which automatically opens when the coupling members are placed in sealed relation with each other; and a modification thereof in which both coupling members carry similar valves, it is obvious that many changes may be made in the arrangements herein shown and described without departing from the spirit of the invention as set forth in the following claims.

What is claimed is:

1. In a separable coupling, a pair of cooperative members, cam means oppositely disposed in one of said members and adapted to coact with camming surface in the other member for urging said members together in fluid-tight relation with a deformable gasket therebetween, thereby compressing said gasket, a valve in at least one of said members, means controlled by said first means for opening said valve a distance greater than the amount said gasket is compressed as said members are urged into said fluid-tight relation, and means cooperating with said valve to cause it to re-seat as said members are separated.

2. In a separable coupling, a pair of members each of which has a passage therethrough, one of said members having a shoulder therein, a sealing gasket positioned on said shoulder, said members including portions adapted to telescope together with said passages in end to end relation as the end of one of said members contacts said sealing gasket, means to urge said members in fluid tight relation, thereby compressing or deforming said gasket, a valve in at least one of said members and compound means controlled by said means to urge and adapted to open said valve a greater distance axially than the distance said gasket is compressed as said members are urged into fluid tight relation, said means to urge also being adapted to close said valve as the members are separated.

3. In a separable coupling, a pair of members each of which has a passage therethrough, one of said members including a male portion and the other member including a female portion having an annular shoulder formed therein, a gasket on said shoulder, said portions being adapted to be telescoped together with the end of said male portion engaging said gasket and with said passages in end to end relation, quick-acting means for urging said members into sealed relation by compressing said gasket on said seat, a valve in at least one of said members and compound lever means controlled by said quick acting means for opening said valve as said members are urged into said sealed relation and for closing said valve as said members are separated.

4. In a separable coupling, a member of generally tubular form having a passage therethrough, an annular groove formed on said member adjacent to one end thereof, means at the other end of said member for connecting the same to means for conveying a fluid medium, abutment means supported in said passage, a second member having a socket formed on one end thereof terminating on a shoulder, the other end of said second member being adapted to be connected to means for conveying a fluid medium, a deformable sealing ring positioned on said shoulder and adapted to be engaged by said first mentioned end of said first member, a valve seat formed in said second member, a valve supported therein, spring means urging said valve toward said seat, means engaging said groove and urging said members together in fluid tight relation and thereby deforming said ring, and compound lever means within said second member pivotally connected to the wall thereof and operatively connected to said valve, said compound bar means also having in contact therewith plunger means adapted to be actuated by said abutment as said ring is being deformed for forcing said valve off of said seat against the urge of said spring means.

5. In a separable coupling, a member of generally tubular form having a passage therethrough, an annular groove formed on said member adjacent to one end thereof, means at the other end of said member for connecting the same to means for conveying a fluid medium, abutment means supported in said passage, a second member having a socket formed on one end thereof terminating on a shoulder, the other end of said second member being adapted to be connected to means for conveying a fluid medium, a deformable sealing ring positioned on said shoulder and adapted to be engaged by said first mentioned end of said first member, a valve seat formed in said second member intermediate the ends thereof, a valve supported therein, spring means urging said valve against said seat, means cooperating with said groove and adapted to force said members together in fluid tight relation, thereby deforming said ring, and compound linkages connected to said valve and pivotally connected to the interior of said second member, and actuating means between said linkages and said abutment adapted, when moved into engagement with said abutment as said sealing ring is deformed, to move said valve off of its seat against the urge of said spring means a distance substantially greater than the amount said sealing ring is deformed.

6. In a separable coupling, a member including a portion of generally tubular form, said member having an annular passage therethrough, an annular groove formed on said tubular portion adjacent to the end thereof, means at the other end of said member for connecting the same to a system conveying a fluid medium, a valve seat formed in said member intermediate the ends thereof, a valve supported therein, spring means urging said valve against said seat, compound linkages connected to said valve and to the interior of said member, plunger means for actuating said linkages and opening said valve, a second member having a socket formed on one end thereof terminating on a shoulder, the other end of said second member being adapted to be connected to a system conveying a fluid medium, a deformable sealing ring positioned on said shoulder and adapted to be engaged by said first mentioned end of said first member, a valve seat formed in said second member intermediate the ends thereof, a valve supported therein, spring means urging said last mentioned valve against said last mentioned seat, compound linkages connected to said last mentioned valve and also to the interior of said second member, a second plunger means for actuating said last mentioned linkages and opening said second mentioned valve, both said plunger means being positioned in the respective members so as to be brought in end to end cooperative relation when said members are brought together, means in said second member adapted to cooperate with the groove on said first member and force said members together in fluid tight relation, thereby substantially deforming said ring and bringing the ends of said plunger means together in actuating relation thereby opening both said valves, as aforesaid, against the urge of the individual spring means a distance substantially greater than the amount said sealing ring is deformed.

7. A separable coupling according to claim 5 in which said second member is comprised of two parts, each provided with flanges and secured together with a gasket therebetween, and in which said valve is substantially larger in diameter than the diameters of the passages in said members.

8. In a separable coupling, a pair of co-operative members having passages therethrough, one of which includes a socket terminating in a shoulder, a deformable sealing ring positioned on said shoulder and adapted to be engaged by the end of the other member, means to urge said members in fluid-tight relation thereby compressing and deforming said ring, a spring loaded valve in one of said members carried on linkages pivotally connected to the inner wall of said last member, a second spring loaded valve also carried on linkages pivotally connected to the inner wall of the other of said members, and individual plunger means in cooperative relation with each of said linkages and adapted to engage one another and open said valves as said members are urged in fluid-tight relation by deforming said ring, said valves being larger in diameter than said passages, each of said members having portions of larger diameter to accommodate its valve and said portions being separable to give access to said valves.

9. A separable coupling according to claim 5, in which said linkages have associated therewith a push rod carrying camming means cooperating with said linkages on one end thereof, the other end thereof being adapted to be actuated by said abutment means.

10. A coupling according to claim 5, in which said valve is comprised of a disc having an annular seating face and carrying slotted lugs, oppositely disposed and spaced apart from each other, said lugs having aligned elongated holes formed therein, and in which said linkages are comprised of two levers one of which carries a pin positioned in the elongated holes in one of the slotted lugs, and the other of which carries a pin positioned in the elongated holes in the other of said slotted lugs, said levers crossing each other in the vicinity of the axis of said coupling members, and a fixed support plate pivotally supporting both said levers, and a movable member camming against said levers where they cross each other and adapted to be actuated by said abutment means as said members are forced together in said fluid tight relation.

JOHN T. KRAPP.

REFERENCES CITED

The following references are of record in the file of this patent:

UNITED STATES PATENTS

| Number | Name | Date |
| --- | --- | --- |
| 1,569,136 | Pardee | Jan. 12, 1926 |
| 1,968,075 | Ewald | July 31, 1934 |